(12) United States Patent
Vithayathil

(10) Patent No.: US 6,587,362 B1
(45) Date of Patent: Jul. 1, 2003

(54) AC-DC CONVERTERS WITH BI-DIRECTIONAL THYRISTOR VALVES

(76) Inventor: John J. Vithayathil, 6685 W. Burnside, Unit 355, Portland, OR (US) 97210

( * ) Notice: Subject to any disclaimer, the term of this patent is extended or adjusted under 35 U.S.C. 154(b) by 0 days.

(21) Appl. No.: 10/150,775

(22) Filed: May 17, 2002

(51) Int. Cl.$^7$ .............................................. H02M 7/155
(52) U.S. Cl. ..................................................... 363/128
(58) Field of Search ............................... 363/39, 44, 45, 363/52, 53, 54, 84, 85, 125, 128

(56) References Cited

U.S. PATENT DOCUMENTS

| | | | | | |
|---|---|---|---|---|---|
| 3,601,659 A | * | 8/1971 | Tanaka | .......................... | 307/86 |
| 4,491,197 A | * | 1/1985 | Nishiwaki | ................. | 187/29 R |
| 4,639,851 A | * | 1/1987 | Johnson | ...................... | 363/164 |
| 5,793,622 A | * | 8/1998 | Dahler et al. | .................. | 363/34 |
| 6,051,893 A | * | 4/2000 | Yamamoto et al. | ........... | 307/43 |

* cited by examiner

Primary Examiner—Matthew Nguyen

(57) ABSTRACT

An ac-dc converter using bi-directional thyristor valves made up of back-to-back connected thyristors as converter valves. The bi-directional thyristor valves permit operation of the converter as a rectifier or an inverter with both polarities of the voltage across the dc terminals of the converter. The bi-directional valves can be used to prevent the reversal of the polarity of the dc voltage across the dc terminals of the converter or to minimize the magnitude of the reverse voltage. The bi-directional thyristor valves can be used to provide protection against overvoltage across the converter valves and eliminate or reduce the energy rating of converter valve arresters. AC-DC converters could also be provided with some bi-directional thyristor valves as converter valves while retaining regular thyristor valves in other converter valve positions

4 Claims, 3 Drawing Sheets

AC-DC CONVERTER WITH BIDIRECTIONAL THYRISTER VALVES

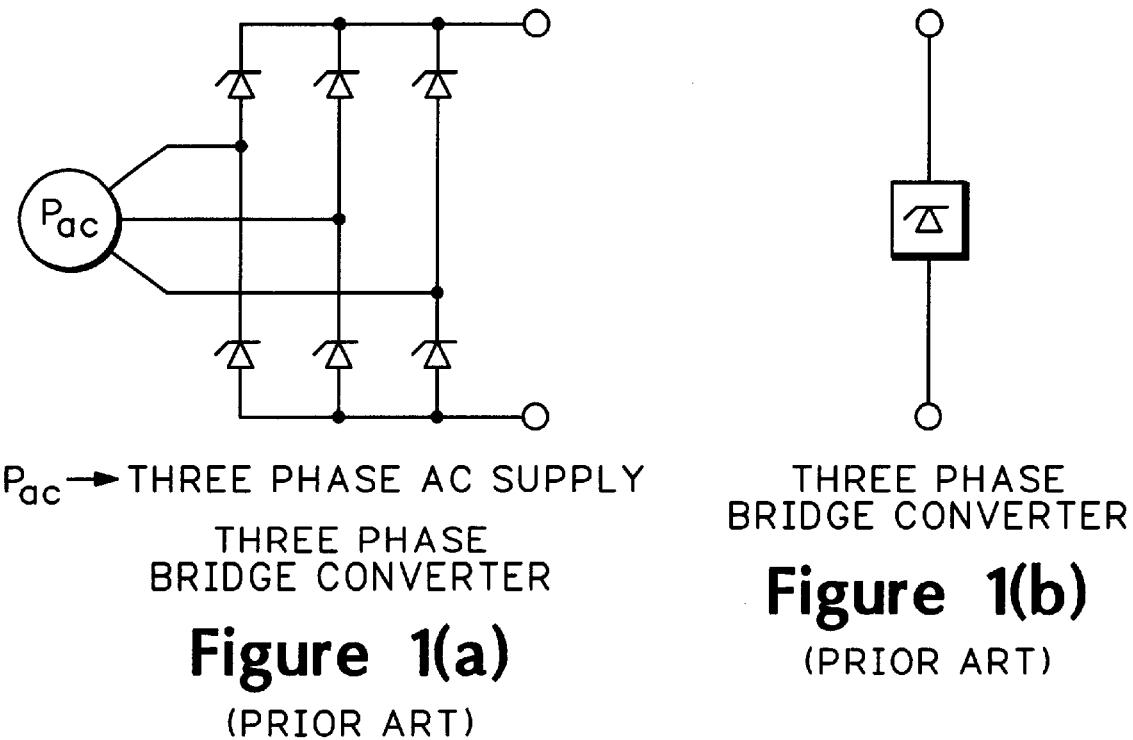
$P_{ac}$ → THREE PHASE AC SUPPLY
THREE PHASE
BRIDGE CONVERTER
Figure 1(a)
(PRIOR ART)
THREE PHASE
BRIDGE CONVERTER
Figure 1(b)
(PRIOR ART)
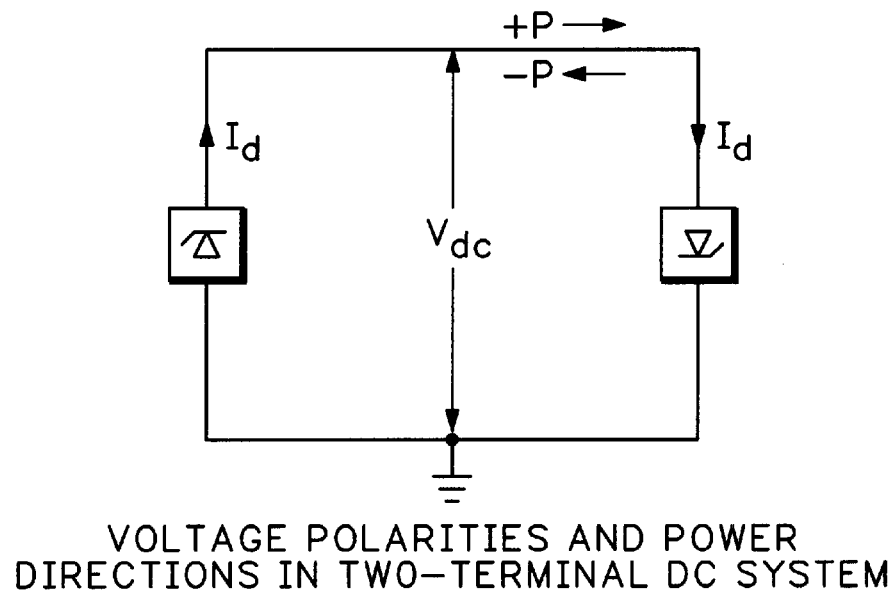
VOLTAGE POLARITIES AND POWER
DIRECTIONS IN TWO-TERMINAL DC SYSTEM
Figure 2
(PRIOR ART)

THREE TERMINAL DC SYSTEM

THREE TERMINAL SYSTEM WITH POLARITY
REVERSAL SWITCHING FOR CONTROL OF
POWER DIRECTION AT STATION A

AC-DC CONVERTER WITH
BIDIRECTIONAL THYRISTER VALVES

AC-DC CONVERTERS WITH BI-DIRECTIONAL THYRISTOR VALVES

BACKGROUND OF THE INVENTION

Conventional ac-dc converters for high power applications such as dc transmission use thyristor valves for ac-dc conversion They can operate as rectifier or inverter by choosing appropriate values for the firing angles. Since the direction of current flow through these valves is in only one direction, the polarity of the voltage across the dc terminals, established by adjustment of the firing angles, determines the direction of the power flow. This is true not only for the three phase bridge circuit used for dc transmission, but also for any type of ac-dc converters using thyristor valves.

A conventional 6-pulse three phase bridge circuit is shown in FIG. 1(a). It is symbolically represented by FIG. 1(b). In principle, FIG. 1(b) could represent any ac-dc converters using thyristor valves, for example, the 12-pulse converter typically used for dc transmission or the single phase converters used for low voltage dc power supplies.

FIG. 2 is a schematic diagram of a two terminal dc transmission system. In such a circuit, the power direction can be easily changed by changing the polarity of the voltage of the dc bus by adjusting the firing angles of the converters of the two terminals. However, in a multi-terminal dc system, the problem of changing the power directions becomes more complicated. Take the example of a three terminal system shown in FIG. 3. The converters A and B are operating as rectifiers and converter C is operating as an inverter. If one wants to change the direction of power in one or two of the three converters without changing the direction of power in the remaining one(s), it is not possible to do so by changing the polarity of the dc bus alone. In the circuit shown in FIG. 3, if the power direction in converter A alone is to be changed, it can be done by polarity reversal switches as shown in FIG. 4. If all converters are to have the flexibility to change the direction of power without necessarily changing the direction of power in the other connected converters, similar arrangement for polarity reversal switching must be provided at all converters. Such polarity reversal arrangement requires additional switches and increased insulation requirements for the converter transformers, bus work and/or valve structures. The necessary switching operations introduce delays in effecting power reversals.

In a bipolar dc transmission system, one method of enhancing the availability of the system is to provide for paralleling of the converters on the two poles to operate in monopolar mode when there is an outage of one pole of the transmission line or cable. Such situations would also require polarity reversal switching arrangements for the converters.

The present invention eliminates the need for polarity reversal switches and higher insulation requirements for converter equipment in such situations. It also provides additional benefits as will be explained later.

BRIEF DESCRIPTION OF THE DRAWINGS

FIGS. 1 to 4 represent prior art. FIG. 1(a) is the converter valve circuit of a three phase bridge converter. FIG. 1(b) is a symbolic representation of converter circuit of FIG. 1(a) for use in FIGS. 2,3 and 4. FIG. 2 represents one pole of a two-terminal dc transmission system showing how the power direction can be reversed without changing the direction of current through the converter valves, but by changing the polarity of the dc voltage. FIGS. 3 and 4 show one pole of a three-terminal dc transmission system to demonstrate how changes in power flow directions in the three terminal system is effected by the use of polarity reversal switches.

DETAILED DESCRIPTION OF THE INVENTION

In the present invention, ac-dc converters use bi-directional thyristor valves made up of back-to-back connected thyristors as the converter valves.

Thyristors could be connected back-to-back in a number of ways to get bi-directional thyristor valve. In a low voltage application where the valve needs only one thyristor level, the bi-directional thyristor valve will have two thyristors, with the anode terminal of one thyristor connected to the cathode terminal of the other. This itself can be achieved in two different ways: the two thyristors are obtained on a single wafer of the semi-conducting material such as silicon, or, a single semi-conductor wafer is processed to have two thyristors. In a bi-directional thyristor with many thyristor levels, the back-to-back connection can be obtained by series connection of back-to-back connected thyristor pairs, back-to-back connection of two strings of series connected thyristors, or series connection of back-to-back connected thyristor modules with number of thyristors in series in each module. In an economic design of the bi-directional thyristor valve, the thyristors in a bi-directional valve may share many of the auxiliary parts associated with thyristor valves, including, but not limited to, such items as snubber circuits, valve reactors, parts of the gate firing system and valve cooling system. Irrespective of the design details, the important thing is that the bi-directional thyristor valve is functionally equivalent to two thyristor valves with the anode terminal of one valve connected to the cathode terminal of the other valve.

Figure 3:
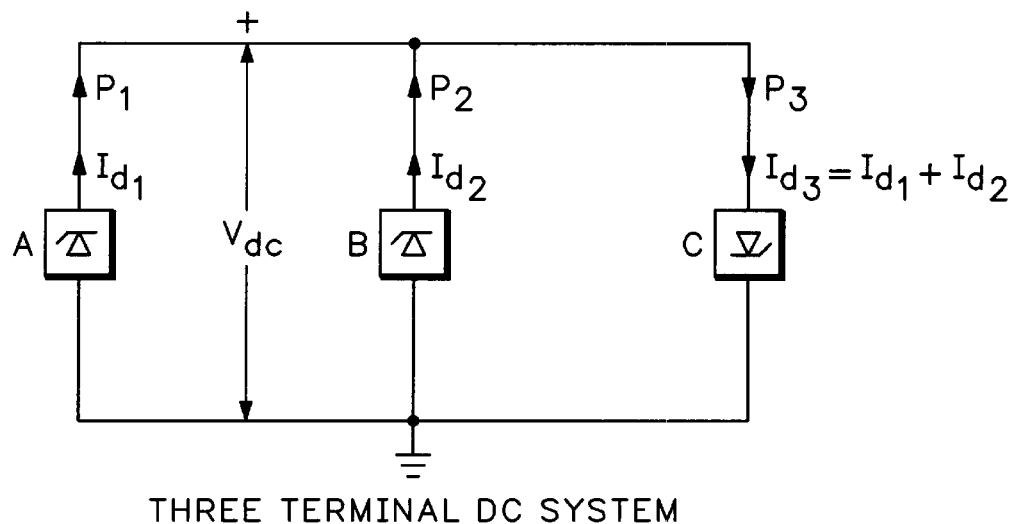
Figure 4:
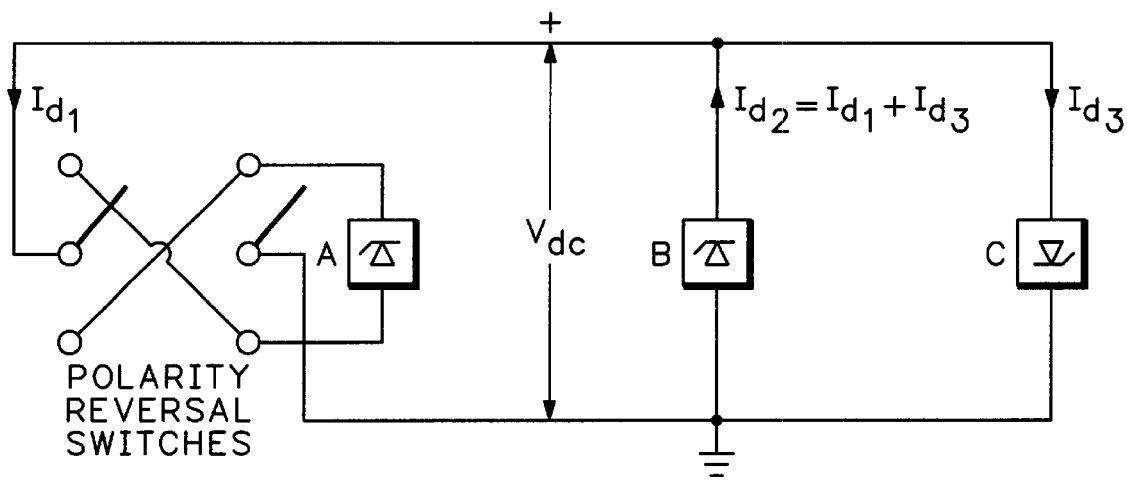
Figure 5:
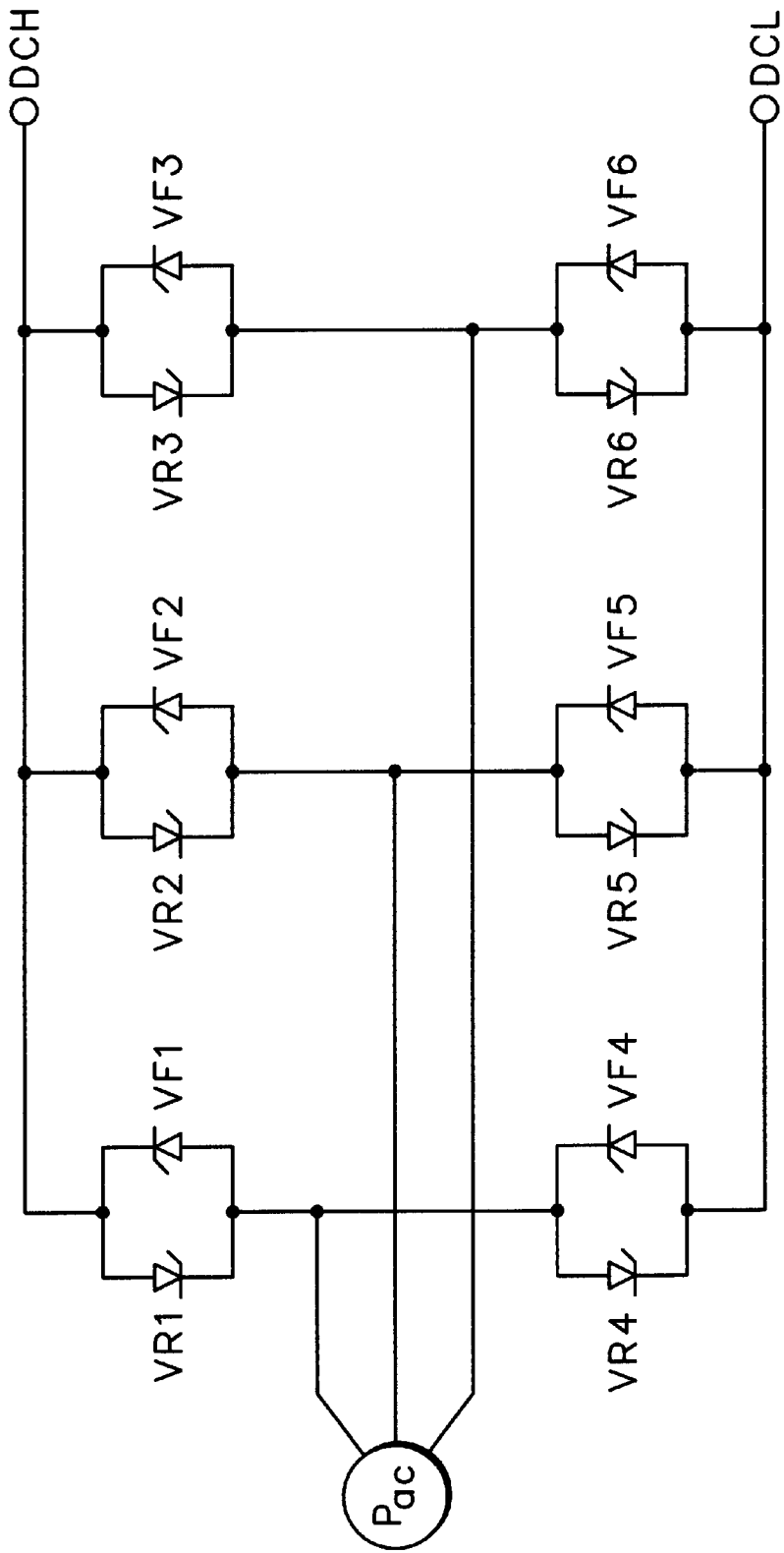
FIG. 5 shows the circuit of a three phase bridge converter using bi-directional thyristor valves.

FIG. 5 shows the circuit of present invention as it applies to 3-phase bridge circuit. Each bi-directional thyristor valve is shown in the figure as two thyristor valves connected back-to-back, with different letters—"F" for forward and "R" for reverse—in their designations to opposite directions of current flow through the two valves. For conversion of ac to dc or dc to ac, only valves conducting in one direction are used as the converter valves, while the valves, which can conduct in the opposite direction, remain blocked. The polarity of the dc voltage of the ac-dc converter will depend on whether the converter is operating as a rectifier or an inverter and the direction in which the bi-directional thyristor valves are conducting. In FIG. 5, when valves denoted with letter F–VF1, VF2,VF3,VF4,VF5 and VF6—are used for ac-dc conversion, the voltage of the dc terminal DCH will be positive with respect to dc terminal DCL if the converter is operating as a rectifier, and negative if the converter is operating as an inverter. If the valves with letters R in the their designations are used for ac-dc conversion, for rectifier operation, the voltage of the terminal DCH will be negative with respect to terminal DCL, and, for operation as inverter, the voltage of the terminal DCH will be positive with respect to terminal DCL. Therefore, with the present invention, it is possible to operate an ac-dc converter as a rectifier or an inverter with the either of the two polarities of the dc terminal voltage without the aid of polarity reversal switching arrangement.

Converters with bi-directional thyristor valves have other advantages.

In one application, the thyristors conducting in one direction could be used for ac-dc conversion, while the thyristors that could conduct in the opposite direction could be used to eliminate or limit the voltage of polarity that is opposite to that of the converter dc voltage. For example, in dc cable applications, the polarity reversal of the voltage on the cables imposes severe stresses on the dc cables. An ac-dc converter connected to a dc cable can use one of the back-to-back connected valves as the converter valves while firing the other valves to form bypass pairs to eliminate or significantly reduce the magnitude of the voltage of reverse polarity across its dc terminal during certain transient disturbances. This could provide new opportunities to use relatively cheap solid dielectric dc cables with converters with thyristor valves—Current Sourced Converters—instead of the more expensive and lossy Voltage Sourced Converters.

Thyristor valves for ac-dc converters are normally provided overvoltage protection by two different methods. For overvoltages in the forward direction, the valves are protected by protective firing of the valves. Such protective firing could be effected passively by BOD's or electronic equivalent of BOD's, or actively by firing the valves when potential overvoltage conditions are detected. Valve arresters provide overvoltage protection in both directions, but are needed primarily for protection against overvoltages in the reverse direction. In converters with bi-directional thyristor valves, protection against overvoltages in both directions can be provided by protective firing alone. Protective firing of one of the pair of back-to-back connected valves can be used to provide protection against overvoltages in the forward direction for itself as well as for protection against overvoltages in the reverse direction for the other valve across it. It will be possible to eliminate the valve arresters in this manner. If, for increased reliability for overvoltage protection, the designer retains the valve arrester, the protective firing could be used to minimize the energy rating of the arresters.

The invention also covers the case in which the ac-dc converter has some bi-directional valves and some conventional thyristor valves. Such an arrangement can be useful in certain applications. AC-DC converters having large capacitance on the dc side, for example in dc transmission with a twelve pulse converters and long dc cables, overvoltage protection of valves connected to the high voltage terminals of the rectifier may require arresters of relatively high energy rating. In such situations, to eliminate, or to reduce the energy rating of, valve arresters across the valves connected to the high voltage terminals, converters could be provided with bi-directional valves for the valves connected to the high voltage terminals, while, dictated by economic considerations, conventional thyristor valves are used in other converter valve positions.

The invention is applicable to any type of ac-dc converter circuit, with single or polyphase ac, and, with or without converter transformers.

I claim:

1. An ac-dc converter with bi-directional thyristor valves made up of back-to-back connected thyristors as converter valves which could operate with two different polarities across its dc terminals by selecting one or the other of the back-to-back connected thyristors for ac-dc conversion in which protective firing of the back-to-back connected thyristors is used to protect overvoltages of both polarities across the bi-directional thyristor valves.

2. An ac-dc converter with bi-directional thyristor valves made up of back-to-back connected thyristors as converter valves which could operate with two different polarities across its dc terminals by selecting one or the other of the back-to-back connected thyristors for a-dc conversion in which the thyristors of the bi-directional thyristor valves conducting in one direction are used for ac-dc conversion and the thyristors conducting in the opposite direction are used to eliminate, or to minimize the magnitude of, the reverse voltage across the dc terminals of the converter.

3. An ac-dc converter with bi-directional thyristor valves made up of back-to-back connected thyristors as converter valves and at least one conventional thyrisor valve as converter valve in which protective firing of the back-to-back connected thyristors is used to protect against overvoltages of both polarities across the bi-directional thyristor valves.

4. An ac-dc converter with bi-directional thyristor valves made up of back-to-back connected thyristors as converter valves and at least one conventional thyristor valve as converter valve in which the thyristors of the bi-directional thyristor valves conducting in one direction are used for ac-dc conversion and the thyristors conducting in the opposite direction are used to eliminate, or to minimize the magnitude of, the reverse voltage across the dc terminals of the converter.

* * * * *